S. CUSTER.
Marine Compass.
No. 55,827. Patented June 26, 1866.
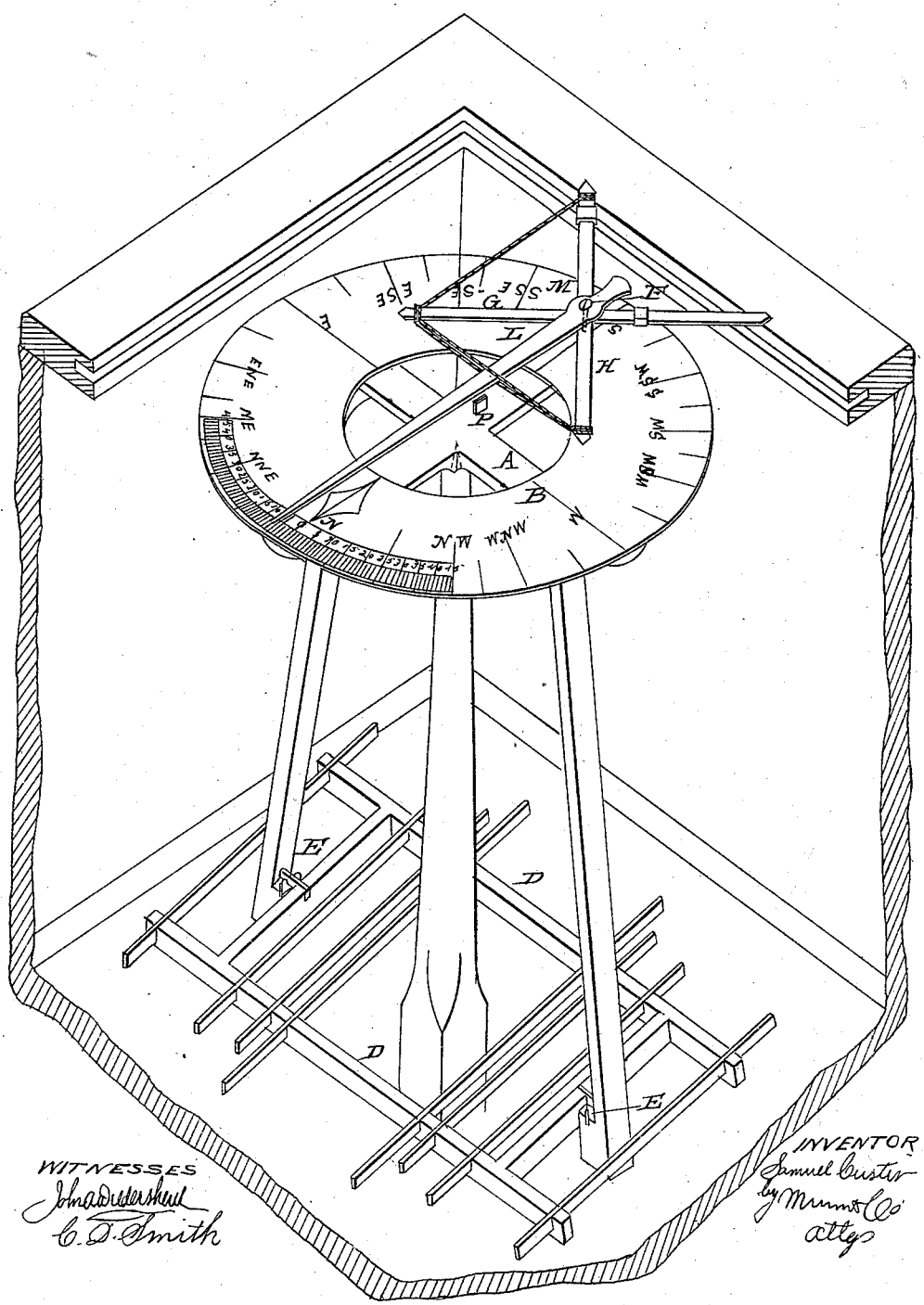

UNITED STATES PATENT OFFICE.

SAMUEL CUSTER, OF SALEM, VIRGINIA.

IMPROVEMENT IN MARINE COMPASSES.

Specification forming part of Letters Patent No. 55,827, dated June 26, 1866.

*To all whom it may concern:*

Be it known that I, SAMUEL CUSTER, of Salem, in the county of Roanoke and State of Virginia, have made new and useful Improvements in Mariners' Compasses; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which my improvements are represented by a perspective view.

My invention consists of a battery of magnetic needles placed below the indicator-magnet, the purpose of said battery of needles being to ascertain by comparison the value or amount of any disturbing local influence which tends to cause deflection of the pointer from its true position relatively to the terrestrial magnetic current.

It also consists in the construction of the cruciform or double magnet formed of two needles fixed to each other, and their respective north poles separated from each other any required number of degrees—say, for instance, ninety degrees—the pointer occupying a position which bisects the angle formed by the two needles.

In the drawings, A A is the main frame, to which the compass-card B is attached. The frame is suspended upon a pivotal point at C, upon which it is delicately poised, turning horizontally with all necessary freedom.

D D is a frame, in which are a number of magnetic needles, forming what I term the "battery," to distinguish it from the upper magnet, M. This frame D is hung upon knife-edges E, so that it is free to rotate in the plane of the meridian. Thus any local attraction below the level of the battery-magnet and causing the "dip" will act upon the battery, and the latter, by its interposition between the disturbing cause and the upper magnet, M, will, by its nearer position, be more deflected than the upper magnet, and thus afford data for estimating the amount of the influence which causes the horizontal aberration. The hinging of the frame renders unnecessary the weighing of the south pole to overcome the influence of the dip which draws it from the horizontal.

The card B on the frame A, in connection with the battery-magnet and the point representing the ship's head in the binnacle, answers to the features of the ordinary compass, the gimbal-joints by which the compass is swung in the binnacle not being represented, as they form no part of my invention.

At F on the frame A rises a point, on which is poised a cruciform magnet, M, formed of two needles, G H, and an indicator or pointer, I, which occupies a middle position between the northern ends of the two needles, bisecting the angle formed by them. This magnet M is so formed as to balance horizontally on the center at F, and of course operates with entire independence in demonstrating its natural proclivity to point to the north in obedience to the influence of the "terrestrial magnetic current," as I believe the world have about agreed to call it.

The magnet M, as has been said, is double. It consists of two needles, and the determination of each being equally to the north, a compromise is effected, by which, as they form an angle of ninety degrees, they, when at rest, without disturbance, point, respectively, to the northeast and northwest, the pointer bisecting their angle becomes the indicator, though not the "conscious needle," its position being the result of the resolution of the impulses of the needles G H.

There are or may be three distinct influences acting upon the magnets, and these are, first, the ordinary tendency of their north poles to point toward that quarter; second, the dip or downward attraction which increases toward the north; and, third, the variation or disturbance due to the presence of iron in the ships, now so much aggravated by the use of sheathing, siding, armor-plating, &c. The first of these influences is legitimate and to the purpose. The influences of the other two are to be avoided so far as possible. The downward influence on the north poles of the needles has the effect of vibrating the battery-magnet D on its centers.

In regard to the surrounding disturbing influences of the armor-plating, &c., although the battery-magnet cannot be relied upon to intercept the influence which these will tend to exert upon the indicator-magnet M, yet it affords the means of estimating it by experiment when the ship is swung to receive her compasses. The respective aberrations of the card which is influenced by the battery and that of the indicator-magnet will enable a calculation which will represent the truth derived from the difference of conduct of the two magnets.

In the drawings the battery-magnet is shown with a dip of about twenty degrees; but it may be in equipoise, and will yield to the depressing influence freely when subjected to it. It is suspended at such distance below the magnet M as experience or the peculiar circumstances of the case may render advisable, and the difference in distance from the disturbing cause of the battery and indicator-magnets will cause, when the object is sufficiently near, a diversity of effect upon the two magnets, by which the value of the disturbance may be estimated, as the indicator varies from the N mark on the card.

The double form of the magnet M, in which the needles, by resolution of forces, only equally approximate to the truth, which is represented by the medial line or indicator, this form—I say, appears to be so far in opposition to the force which impels the needles to their meridian line that the influence is more decided than when but one needle is affected—that is to say, the needle, when swerving far from the true position, is influenced more powerfully to resume it than when but a very small degree out of its normal position. I believe the directive force of the terrestial magnetic current upon the combined needles is greater than upon a single needle.

Under some circumstances I have used a small magnet, P, at or near the axis of vibration of the frame, and with its north pole upward, in which condition it repels the north poles of the needles G H, and is supposed to assist them in the decision of their movements.

Having described my invention, what I claim therein as new, and desire to secure by Letters Patent, is—

1. The combination of the lower battery-magnet with the upper indicator-magnet, substantially as and for the purpose described.

2. The construction of the cruciform indicator-magnet with a pointer placed between the north and south poles of its two needles.

3. The arrangement of the indicator-magnet upon and eccentric with the main compass-card or its frame, for securing a longer radius to the pointer.

To the above-described specification for improvement in compasses I have signed my hand this 20th day of October, 1865.

SAML. CUSTER.

Witnesses:
W. F. HALL,
EDWARD H. KNIGHT.